United States Patent
Park

(10) Patent No.: US 7,261,600 B2
(45) Date of Patent: Aug. 28, 2007

(54) DIGITAL VIDEO RECORDER WITH SLOT TYPE MAINBOARD

(75) Inventor: Jung-Jae Park, Gyunggi-do (KR)

(73) Assignee: Rifatron Co., Ltd., Seoul (KR)

( * ) Notice: Subject to any disclaimer, the term of this patent is extended or adjusted under 35 U.S.C. 154(b) by 0 days.

(21) Appl. No.: 11/335,596

(22) Filed: Jan. 20, 2006

(65) Prior Publication Data

US 2006/0134941 A1  Jun. 22, 2006

Related U.S. Application Data

(63) Continuation-in-part of application No. 10/910,358, filed on Aug. 4, 2004, now Pat. No. 7,044,801.

(30) Foreign Application Priority Data

Aug. 6, 2003 (KR) .............. 10-2003-0054382

(51) Int. Cl.
  *H01R 25/00* (2006.01)
  *H01R 27/02* (2006.01)
  *H01R 31/00* (2006.01)
(52) U.S. Cl. ................... 439/638; 439/65
(58) Field of Classification Search .......... 439/638, 439/45, 61, 65, 75, 74
  See application file for complete search history.

(56) References Cited

U.S. PATENT DOCUMENTS

| | | | | |
|---|---|---|---|---|
| 4,936,785 A | * | 6/1990 | Krug et al. | 439/75 |
| 5,754,796 A | * | 5/1998 | Wang et al. | 710/301 |
| 6,039,581 A | | 3/2000 | DiMarco | |
| 6,046,912 A | * | 4/2000 | Leman | 361/784 |
| 6,050,831 A | * | 4/2000 | Wu et al. | 439/76.1 |
| 6,409,526 B1 | | 6/2002 | Malone et al. | |
| 6,482,042 B1 | | 11/2002 | Tupper | |
| 6,533,587 B1 | | 3/2003 | Potter et al. | |
| 6,644,979 B2 | * | 11/2003 | Huang | 439/65 |
| 6,899,547 B1 | | 5/2005 | Chang et al. | |

* cited by examiner

*Primary Examiner*—Hae Moon Hyeon
(74) *Attorney, Agent, or Firm*—Finnegan, Henderson, Farabow, Garrett & Dunner, L.L.P.

(57) ABSTRACT

A digital video recorder is described. The digital video recorder may include a plurality of male slots, an image compression substrate connected to a first one of the plurality of male slots, and a function expansion substrate connected to a second one of the plurality of male slots. The image compression substrate may accommodate a plurality of image channels and may support a high-speed data bus dedicated for an image. The function expansion substrate may support a PCI type device. Moreover, the function expansion substrate and the image compression substrate may use separate buses, thereby improving system performance and speed.

5 Claims, 2 Drawing Sheets

DIGITAL VIDEO RECORDER WITH SLOT TYPE MAINBOARD

RELATED APPLICATIONS

This application is a continuation-in-part of and claims benefit of application Ser. No. 10/910,358 now U.S. Pat. No. 7,044,801, entitled "Digital video recorder with slot type mainboard," filed Aug. 4, 2004, which claims priority of Korean Application No. 10-2003-0054382, filed Aug. 6, 2003, both of which are incorporated herein by reference.

TECHNICAL FIELD

The present invention is related to a digital video recorder, in particular to a digital video recorder with slot type mainboard.

BACKGROUND

A conventional digital video recorder is formed mainly as an on-board structure in a stand-alone version. Therefore, expansion of the stand-alone version is not executed easily. That is, there was a problem because when the number of channels required by users changed, a new substrate for the conventional digital video recorder had to be manufactured. Conventional digital video recorder was generally produced with setting four channels as a basis. But, nowadays, as the functions of the digital video recorder are getting diversified, versions of digital video recorders are increasing bit by bit while connecting the digital video recorder to various kinds of outside devices. So, since the number of necessary channels is increasing, there has been difficulty in changing the number of channels.

Moreover, in a Personal Computer (PC) version of a digital video recorder, image information is transmitted to a main Central Processing Unit (CPU) through a peripheral component interconnect (PCI) slot and data bus speed is reduced according to the number of cards that are inserted into the PCI slot.

SUMMARY OF THE INVENTION

Accordingly, the present invention solves above-mentioned conventional technical problems, and the object of the present invention is to provide a digital video recorder that can increase the channels required by the users without reducing speed of the channels by using a multi-bus, even when PCI substrates other than an image compression substrate are inserted into the PCI slot. This may be accomplished by providing a high-speed data bus dedicated for an image (HPI) and realizing integration of an image compression substrate that is inserted into the PCI slot.

The structure of the present invention for achieving above purpose is composed of a plurality of male slots including PCI slots, an image compression substrate including a plurality of channels, a male-female connector which is connected to one side of a lower surface of the image compression substrate and inserted into one of the plurality of male slots, a male connector arranged on a side surface of the male-female connector, and a female connector formed on one side of a lower surface of the image compression substrate and connected to the male connector arranged on the side surface of the male-female connector.

DETAILED DESCRIPTION

The preferred embodiment will be described in detail with referring to the attached drawings.

Figure 1:
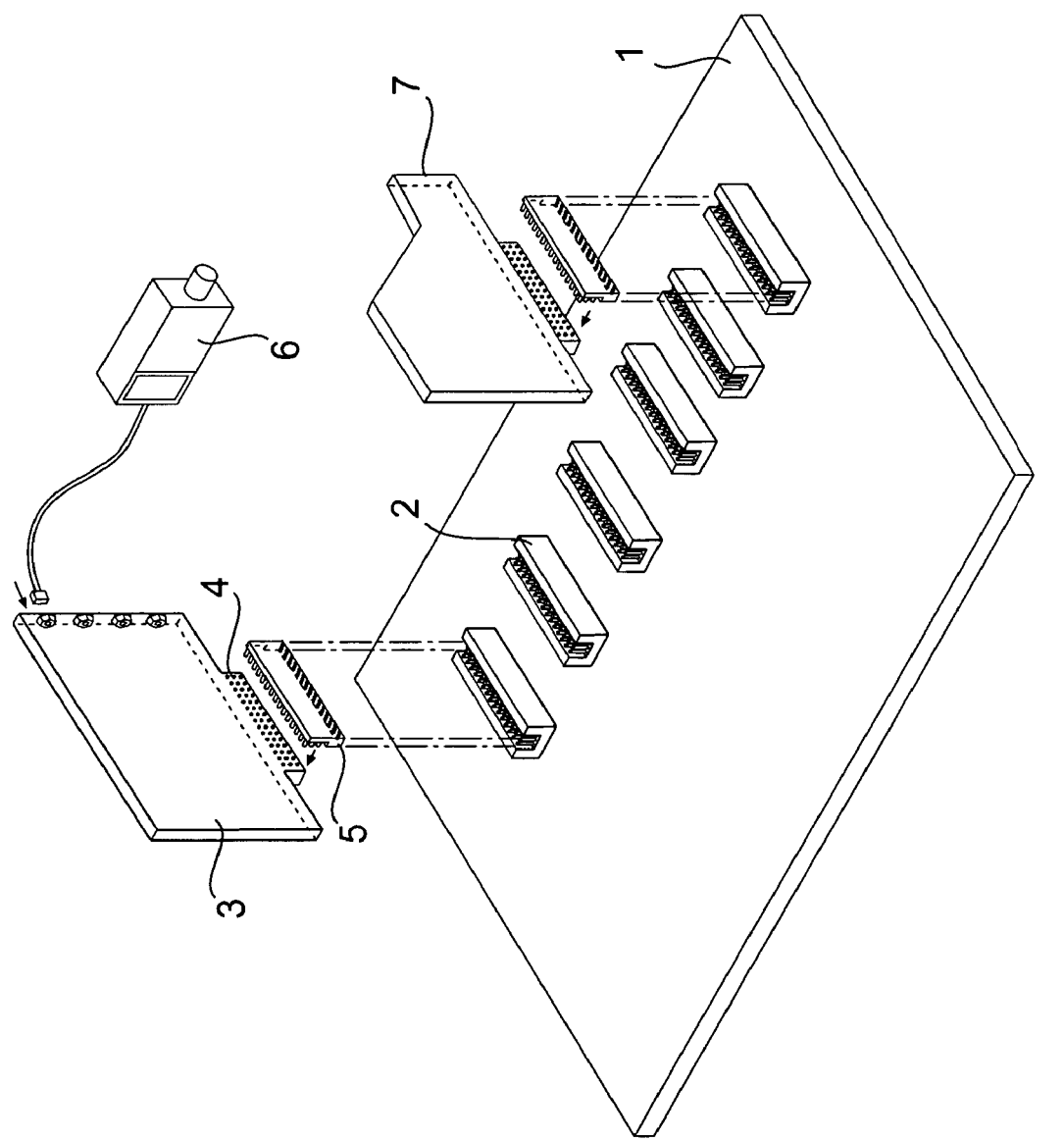
FIG. 1 shows a slanting view representing the connection relationships between male slots mounted on a mainboard of a digital video recorder and an image compression substrate.

FIG. 1 shows a slanting view representing the connection relationships between a plurality of male slots (2) mounted on a mainboard (1) of a digital video recorder and an image compression substrate (3).

Figure 2:
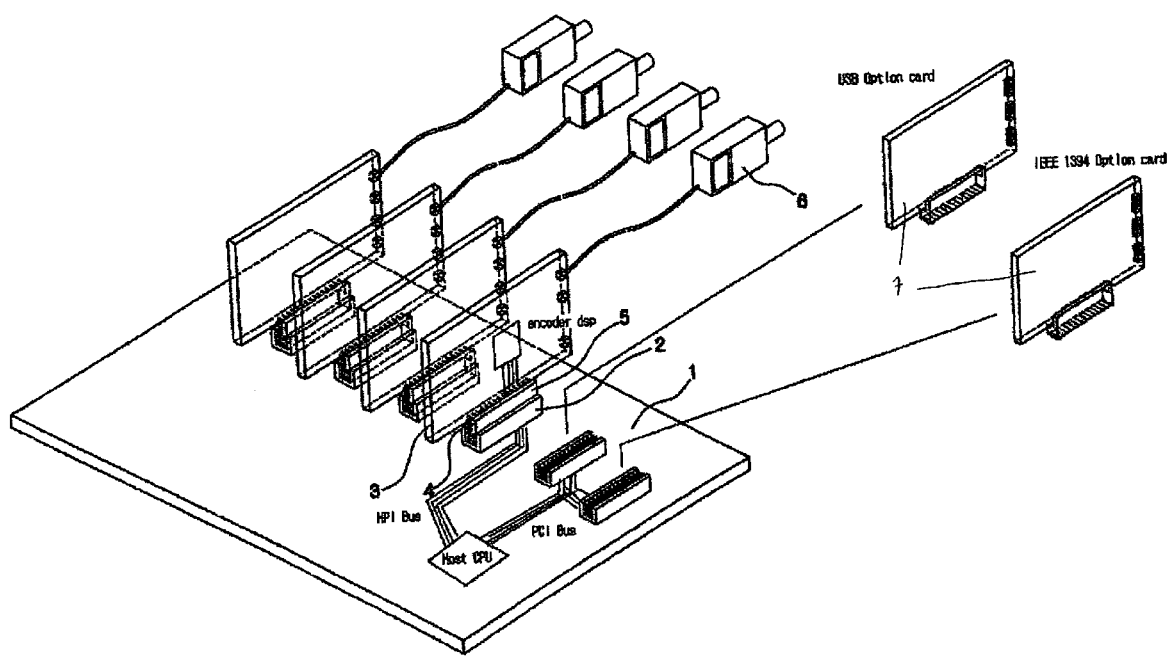
FIG. 2 shows a slanting view representing the connection relationships between the digital video recorder and the image compression substrate mounted via the male slots on the mainboard.

As is shown, the image compression substrate is connected to one male slot (2) of the plurality of male slots (2) mounted on the mainboard. The connection relationships will be described in detail. A male-female connector (5) is inserted between the male slot (2), and a female connector (4) protruding from the lower part of one side of the image compression substrate (3), thereby connecting the male slot (2) and the female connector (4). That is, the male slot (2) is connected to the female connector of the male-female connector (5), and the female connector (4) of the image compression substrate (3) is connected to the male connector of male-female connector (5). Therefore, based upon the above-mentioned relationships, the image compression substrate (3) is connected to one of a plurality of male slots (2) mounted on the mainboard (1). The image compression substrate (3) will be explained in detail with reference to FIG. 1 and FIG. 2. Four connection terminals (not shown) are arranged on one side of the image compression substrate (3). Accordingly, it can be connected to outside devices (6), such as a video camera or a Closed Circuit Television (CCTV) device. Then, images inputted through image input terminals of the image compression substrate (3) from the outside devices (6) connected as described above, are transmitted to the input of a digital signal processor (not shown) and are compressed and output as individual streams. Each stream of compressed outside images is transmitted to the mainboard (1) through male slot (2), respectively, by using a Host Port Interface (HPI) bus method. Furthermore, this separate bus can be used even when a function expansion substrate (7) (e.g., a Universal Serial Bus (USB) card or a Institute of Electrical and Electronics Engineering (IEEE) 1394 card) for supporting a PCI type is inserted into a PCI slot, since function expansion substrate (7) for supporting a PCI type may use a PCI bus, which is completely separated from the HPI bus. Accordingly, depending upon how many image compression substrates (3) are inserted into the mainboard (1), it is possible to produce a digital video recorder having 4 channels, 8 channels or 12 channels, regardless of the amount of buses used by function expansion substrates.

The embodiment of the present invention is described only for the illustration, it is natural that the changes or the modifications can be made by a person having ordinary skill in the art to which the invention pertains if they are within the scope and true meanings of the present invention.

INDUSTRIAL APPLICABILITY

In connection with the structure of the mainboard of the digital video recorder consistent with the present invention, a substrate supporting communication of a high-speed data bus dedicated for an image (e.g., HPI) by compressing a plurality of images is formed. The mainboard is provided with many PCI slots. Therefore, there are merits that it is possible to assemble the products easily, and the speed is not reduced even when PCI substrates other than the image compression substrate are inserted into the PCI slots. Besides, when the products are damaged or do not function, the products may be repaired by replacing only the damaged substrate with a new one, and there is an effect that it is possible to use the products by replacing only the substrate with a new one when the products are upgraded or the functions are changed, and it is necessary to replace the substrate.

The invention claimed is:

1. A digital video recorder comprising:
   a plurality of male slots;
   a main board for supporting the plurality of male slots;
   an image compression substrate connected to a first one of the plurality of male slots, the image compression substrate being adapted to accommodate a plurality of image channels and support a high-speed data bus dedicated for an image; and
   a function expansion substrate connected to a second one of the plurality of male slots, the function expansion substrate being adapted to support a PCI type device,
   wherein the function expansion substrate and the image compression substrate use separate buses, thereby improving system performance and speed.

2. The digital video recorder of claim 1, wherein the plurality of male slots includes slots of PCI type and the PCI type device supported by the function expansion substrate includes at least one of a USB device and an IEEE 1394 device.

3. The digital video recorder of claim 1, further including a connector to connect the image compression substrate with the first one of the plurality of male slots, wherein the connector connects to one side of a lower part of the image compression substrate.

4. The digital video recorder of claim 3, wherein the one side of the lower part of the image compression substrate includes a female connector that is arranged on a surface of the image compression substrate and that is substantially perpendicular to a digital video recorder mainboard surface that holds the plurality of male slots.

5. The digital video recorder of claim 1, wherein the image compression substrate is adapted to accommodate at least four image channels.

* * * * *